United States Patent
Proud et al.

(10) Patent No.: US 11,347,627 B2
(45) Date of Patent: May 31, 2022

(54) SYSTEM FOR CUSTOMIZATION OF SOFTWARE PLATFORMS FOR IMPLEMENTATION IN LEGACY SYSTEMS

(71) Applicant: BANK OF AMERICA CORPORATION, Charlotte, NC (US)

(72) Inventors: Lee Ann Proud, Ponte Vedra, FL (US); Joseph Benjamin Castinado, North Glenn, CO (US); Martha Sain McClellan, Lancaster, SC (US); Kathleen Hanko Trombley, Oakboro, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 81 days.

(21) Appl. No.: 16/534,911

(22) Filed: Aug. 7, 2019

(65) Prior Publication Data
US 2021/0042211 A1 Feb. 11, 2021

(51) Int. Cl.
G06F 11/36 (2006.01)
G06F 11/14 (2006.01)
G06F 11/07 (2006.01)

(52) U.S. Cl.
CPC ...... *G06F 11/3664* (2013.01); *G06F 11/0766* (2013.01); *G06F 11/1484* (2013.01); *G06F 11/368* (2013.01)

(58) Field of Classification Search
None
See application file for complete search history.

(56) References Cited

U.S. PATENT DOCUMENTS

| | | | | |
|---|---|---|---|---|
| 10,303,586 B1* | 5/2019 | Falko | | G06F 11/368 |
| 10,592,403 B2* | 3/2020 | Reeve | | G06F 11/3696 |
| 2007/0168744 A1* | 7/2007 | Pal | | G06F 11/3457 714/38.1 |
| 2016/0034260 A1* | 2/2016 | Ristock | | G06F 9/453 717/109 |
| 2019/0079849 A1* | 3/2019 | Korn | | G06F 11/3457 |
| 2019/0138280 A1* | 5/2019 | Ma | | G06F 8/60 |
| 2020/0004518 A1* | 1/2020 | Ryall | | G06F 8/70 |

\* cited by examiner

*Primary Examiner* — Lewis A Bullock, Jr.
*Assistant Examiner* — Mark A Gooray
(74) *Attorney, Agent, or Firm* — Moore & Van Allen PLLC; R. W. McCord Rayburn (57) ABSTRACT

A system for customizing and testing software application platforms is provided. The system comprises: a memory device with computer-readable program code stored thereon; a communication device connected to a network; and a processing device, wherein the processing device is configured to execute the computer-readable program code to: generate an application test environment, the application test environment being connected to an internal database comprising one or more application modules, wherein the one or more application modules may be selectively activated in the application test environment; extract external data from an external data source associated with the user, the external data being associated with a preexisting application platform; import the external data into the application test environment; and construct a new application platform in the application test environment, wherein the external data is integrated into the application test environment with the one or more application modules of the internal database.

15 Claims, 6 Drawing Sheets

SYSTEM FOR CUSTOMIZATION OF SOFTWARE PLATFORMS FOR IMPLEMENTATION IN LEGACY SYSTEMS

BACKGROUND

Continued development of modern application platforms and specific-use computing devices has led to a number of various application modules being made available for deployment in a constructed system. Therefore, there exists a need for an improved system for constructing new application platforms having transparent module implementation and platform deployment in a production-level environment.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for customizing and testing software application platforms is provided. The system comprises: a memory device with computer-readable program code stored thereon; a communication device connected to a network; and a processing device, wherein the processing device is configured to execute the computer-readable program code to: generate an application test environment, the application test environment being connected to an internal database comprising one or more application modules, wherein the one or more application modules may be selectively activated in the application test environment; extract external data from an external data source associated with the user, the external data being associated with a preexisting application platform; import the external data into the application test environment; and construct a new application platform in the application test environment, wherein the external data is integrated into the application test environment with the one or more application modules of the internal database.

In one embodiment, the processing device is configured to execute the computer-readable program code to: receive a selection request from the user to selectively activate or deactivate at least one of the one or more application modules; and in response to receiving the request, activate or deactivate the at least one of the one or more application modules for the new application platform in the application test environment.

In another embodiment, the processing device is configured to execute the computer-readable program code to transfer the new application platform from the application test environment to a production environment. In yet another embodiment, the processing device is configured to execute the computer-readable program code to: monitor the new application platform in the production environment for an anomaly; detect the anomaly in the new application platform; and in response to detecting the anomaly, pull the new application platform from the production environment, wherein the new application platform is reverted to the application testing environment.

In yet another embodiment, the application test environment is generated on a virtual machine.

In yet another embodiment, the external data comprises one or more external application modules or one or more legacy application modules, and wherein the processing device is configured to execute the computer-readable program code to integrate the one or more external application modules or the one or more legacy application modules into the application test environment with the one or more application modules of the internal database.

In yet another embodiment, the system further comprises a display device configured for presenting a user interface, wherein the processing device is configured to execute the computer-readable program code to cause the display device to display the one or more application modules, wherein the one or more application modules are selectively activatable in the application test environment in response to a user selection of the one or more application modules.

In yet another embodiment, the external data comprises production environment data stored in the external data source associated with the user. In yet another embodiment, the external data is temporarily stored in the application test environment, and wherein the processing device is configured to execute the computer-readable program code to remove the external data from the application test environment following a termination of the application test environment.

A computer program product for customizing and testing software application platforms is also provided. The computer program product comprises a non-transitory computer-readable medium comprising computer-readable instructions, the computer-readable instructions, when executed by a processing device, cause the processing device to: generate an application test environment, the application test environment being connected to an internal database comprising one or more application modules, wherein the one or more application modules may be selectively activated in the application test environment; extract external data from an external data source associated with the user, the external data being associated with a preexisting application platform; import the external data into the application test environment; and construct a new application platform in the application test environment, wherein the external data is integrated into the application test environment with the one or more application modules of the internal database.

In one embodiment, the computer-readable instructions, when executed by the processing device, cause the processing device to: receive a selection request from the user to selectively activate or deactivate at least one of the one or more application modules; and in response to receiving the request, activate or deactivate the at least one of the one or more application modules for the new application platform in the application test environment.

In another embodiment, the computer-readable instructions, when executed by the processing device, cause the processing device to transfer the new application platform from the application test environment to a production environment. In yet another embodiment, the computer-readable instructions, when executed by the processing device, cause the processing device to: monitor the new application platform in the production environment for an anomaly; detect the anomaly in the new application platform; and in response to detecting the anomaly, pull the new application platform from the production environment, wherein the new application platform is reverted to the application testing environment.

In yet another embodiment, the application test environment is generated on a virtual machine.

In yet another embodiment, the external data comprises one or more external application modules or one or more legacy application modules, and wherein the computer-readable instructions, when executed by the processing device, cause the processing device to integrate the one or more external application modules or the one or more legacy application modules into the application test environment with the one or more application modules of the internal database.

In yet another embodiment, the computer-readable instructions, when executed by the processing device, cause the processing device to cause a display device configured for presenting a user interface to display the one or more application modules, wherein the one or more application modules are selectively activatable in the application test environment in response to a user selection of the one or more application modules.

In yet another embodiment, the external data comprises production environment data stored in the external data source associated with the user. In yet another embodiment, the external data is temporarily stored in the application test environment, and wherein the computer-readable instructions, when executed by the processing device, cause the processing device to remove the external data from the application test environment following a termination of the application test environment.

A computer-implemented method for customizing and testing software application platforms is also provided. The computer-implemented method comprising: generating an application test environment, the application test environment being connected to an internal database comprising one or more application modules, wherein the one or more application modules may be selectively activated in the application test environment; extracting external data from an external data source associated with the user, the external data being associated with a preexisting application platform; importing the external data into the application test environment; and constructing a new application platform in the application test environment, wherein the external data is integrated into the application test environment with the one or more application modules of the internal database.

In one embodiment, the computer-implemented method further comprises transferring the new application platform from the application test environment to a production environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the invention, as described herein, leverage complex, specific-use computer system to provide a novel approach for application platform construction. The system of the present invention is configured to provide an application testing environment in which an application platform may be constructed and experienced by a user before the application platform is introduced to a production-level environment. The system is configured to extract, import, and integrate external user data including external application modules into the testing environment to realistically simulate the user's platform in production. By using real user data, the system may be configured to identify and rectify compatibility issues in the newly constructed platform at a testing level before the platform is put into production. In a specific embodiment, the system may import legacy application modules from an external user data source, wherein the legacy application modules may be integrated or optionally replaced with new application modules while constructing the new application platform for the user.

In the testing environment, the system is configured to enable users to easily add and/or remove application modules to and from the constructed platform in real-time to allow the user to test or experiment with one or more modules for potential inclusion in the platform. In one embodiment, the system may be further configured to build and transfer a new application platform to a production environment. As the system integrates real user data extracted from the user's system, the new application platform may be easily transferred and implemented in the production environment with little to no downtime. In another embodiment, the system is configured to monitor performance of a new application platform in a production environment for potential anomalies, incompatibilities, bugs, or the like. In response to identifying an anomaly, the system may be configured to withdraw or pull the new platform back to a testing environment to rectify the issues.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the application construction system. In some embodiments, a user may be a computing device user, a phone user, a mobile device application user, a customer of an entity or business, a system operator, and/or employee of an entity (e.g., a financial institution). In one embodiment, a user may be a merchant or business owner who is a customer of an software providing entity. In a specific embodiment, a user is a customer requesting one or more application modules for constructing an application platform from the one or more application modules as well as legacy or preexisting modules from a preexisting application platform. In another embodiment, a user may be an employee of an entity that provides application modules to other users as a service. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, automated teller machines (ATMs), or any combination of the aforementioned. The device may be used by the user to access the system directly or through an application, online portal, internet browser, virtual private network, or other connection channel. In one embodiment, a user device may comprise a virtual machine hosted on another device or system described herein, wherein a user may remotely access the virtual machine and a computing platform or application stored thereon.

As used herein, the term "entity" may be used to include any organization or collection of users that may interact with the application construction system. An entity may refer to a business, company, or other organization that either maintains or operates the system or requests use and accesses the system. In one embodiment, the entity may be a software development entity or data management entity. In a specific embodiment, the entity may be associated with a financial institution, wherein the entity develops and/or provides software to other users and entities such as merchants as a service (e.g., business solutions software and applications). The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, drag-and-drop, toggling, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transaction, exchange, or transmission of resources (e.g., funds or data (i.e., files)) between devices either directly or via an intermediate system (e.g., an entity system and/or the application construction system described below). In another embodiment, an interaction may comprise an upload or transfer of data.

Figure 1:
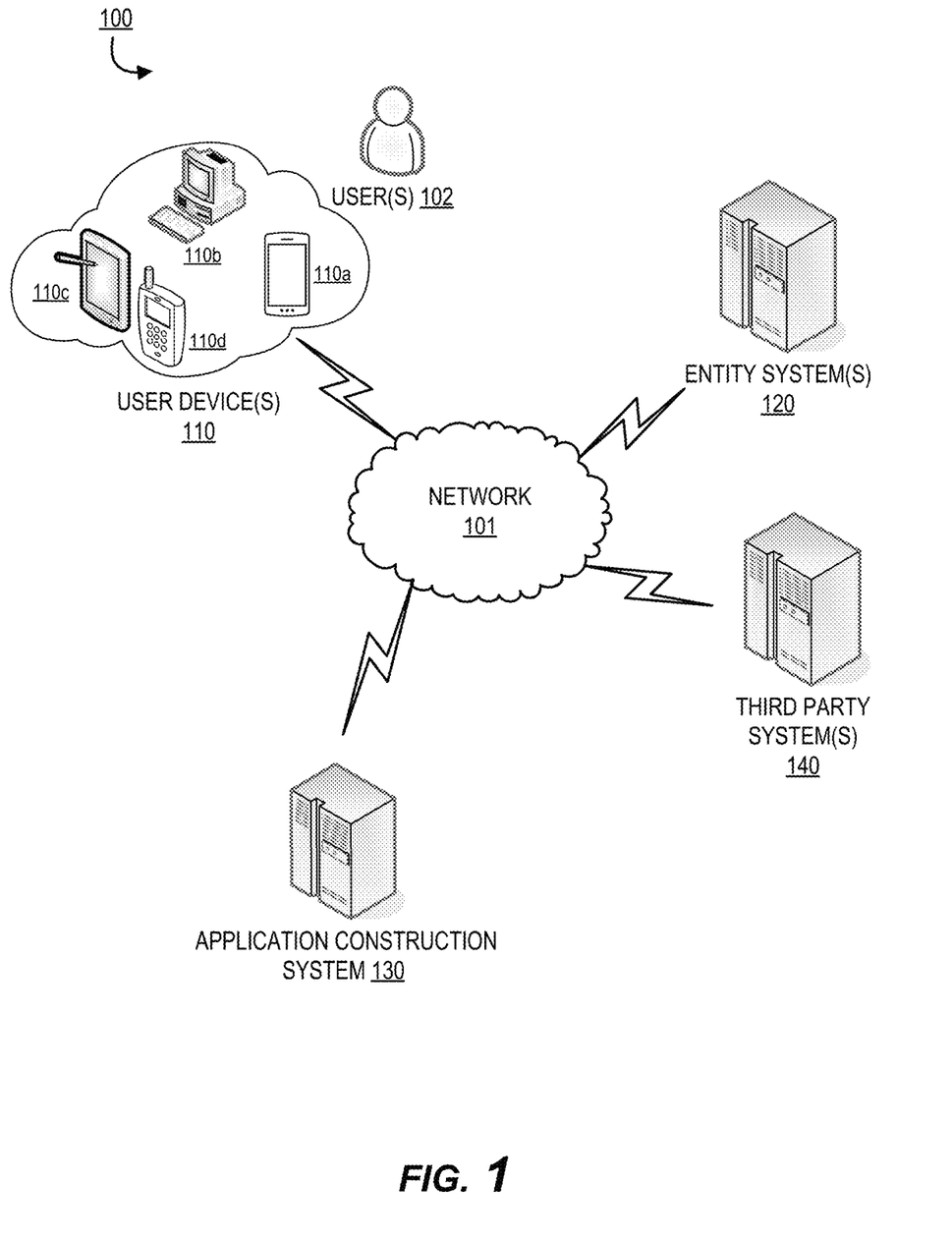
FIG. 1 provides an application construction environment, in accordance with one embodiment of the invention.

FIG. 1 provides an application construction system environment 100, in accordance with one embodiment of the invention. As illustrated in FIG. 1, application construction system 130 is operatively coupled, via a network 101, to the user device(s) 110 (e.g., a plurality of user devices 110a-110d), the entity system(s) 120, and third party system(s) 140. In this way, the application construction system 130 can send information to and receive information from the user device 110, the entity system 120 and the third party system 140. In the illustrated embodiment, the plurality of user devices 110a-110d provide a plurality of communication channels through which the entity system 120, third party system 140, and/or the application construction system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120, third party systems 140, and/or other user devices via a user device 110 while a data stream or flow between the user device 110 and the entity system 120 and/or other user devices is intercepted and monitored by the application construction system 130 over the network 101. In some embodiments a user 102 is a user requesting service from the entity or interacting with an account maintained by the entity system 120. In an alternative embodiment, the user 102 is an individual interacting with the application construction system 130 over the network 101 and monitoring input of information from the entity systems 120 and/or third party systems 140 to and from the application construction system 130 for processing and analysis (e.g., an employee of the entity operating and/or monitoring the systems 120, 130). In an alternative example, the interaction may be processed through another system such as entity system 120 and/or application construction system 130. In one embodiment, the user 102 is a third party customer such as a merchant or a business owner associated with the third party systems 140, wherein user data stored on the third party system 140 is imported to a testing environment associated with the application construction system 130.

Figure 2:
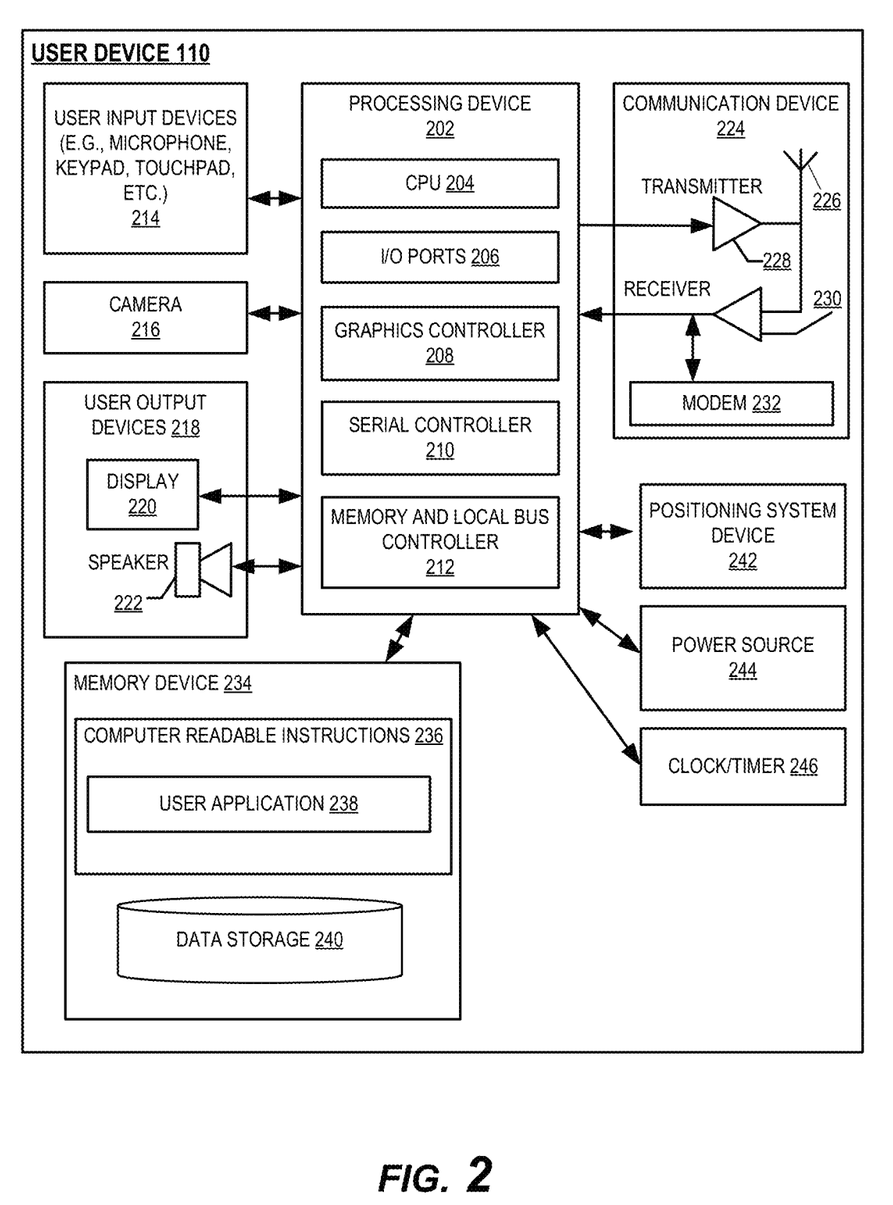
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner, barcode reader, or any other image capturing device or sensor configured to capture an image. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120, application construction system 130, and/or third party system 140. In one embodiment, the user application 238 may be configured to allow a user 102 to request, initiate, and/or receive an interaction with another device or system. In some embodiments, a user application 238 may be configured to allow a user to interact with the application construction system 130 to construct an application platform in a testing environment using data (e.g., application modules) stored in the entity systems 120 and/or the third party systems 140.

The processing device 202 may be configured to use the communication device 224 to communicate with one or more other devices on a network 101 such as, but not limited to the entity system 120 and the record tracking system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238 are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
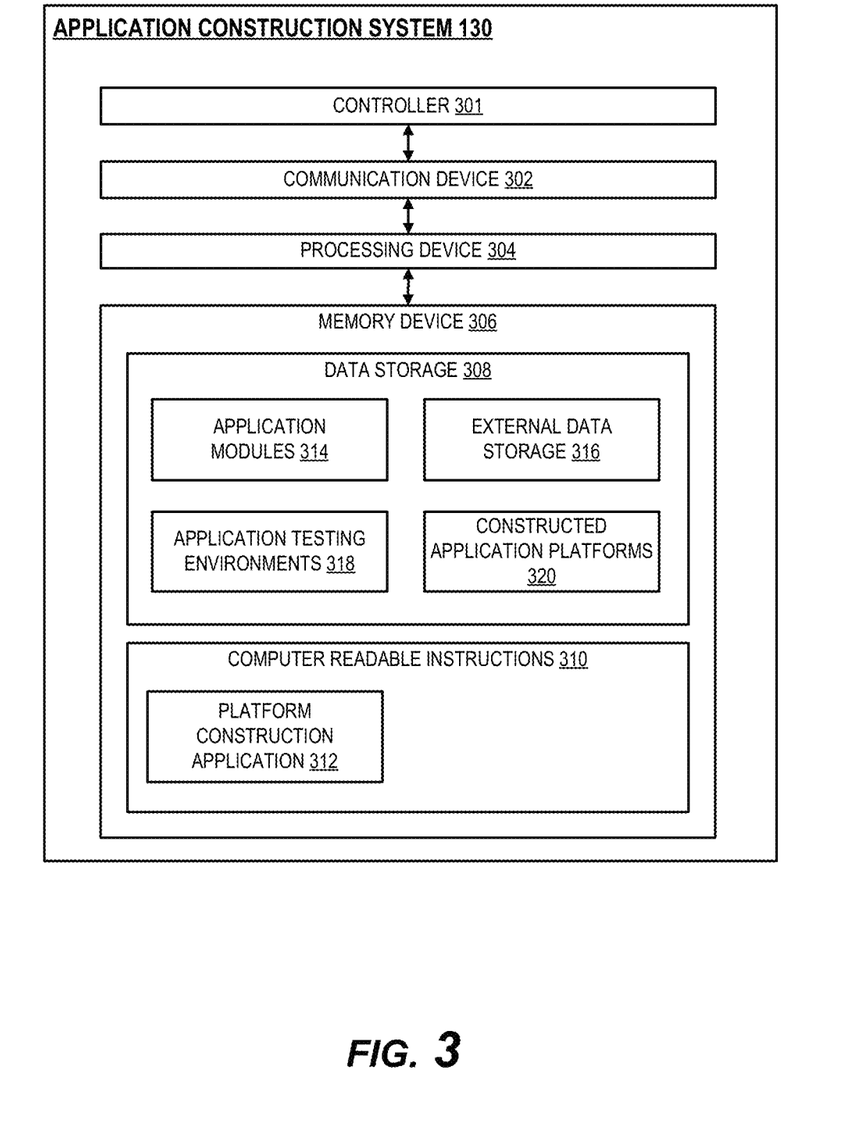
FIG. 3 provides a block diagram of an application construction system, in accordance with one embodiment of the invention.

FIG. 3 provides a block diagram of an application construction system 130, in accordance with one embodiment of the invention. The application construction system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, the third party system 140, and/or the application construction system 130, in order to interface and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110, the entity system 120, and the third party system 140. As such, the communication device 302 generally comprises a modem, server, or other device for communicating with other devices on the network 101.

As further illustrated in FIG. 3, the application construction system 130 comprises computer-readable instructions 310 stored in the memory device 306, which in one embodiment includes the computer-readable instructions 310 of a platform construction application 312. In an alternative embodiment, the platform construction application 312 may be installed on another device such as directly on a user device 110. The platform construction application 312 may be configured to generate an application testing environment in which a user may construct a new application platform from one or more provided and/or imported application modules.

In some embodiments, the memory device 306 includes data storage 308 for storing data related to the system environment, but not limited to data created and/or used by the platform construction application 312. Data stored in the data storage 308 may comprise one or more application modules 314, external data storage 316, application testing environments 318, and, construction application platforms 320. The one or more application modules 314 may be used by the application construction system 130 to construct an application platform. In one embodiment, the application modules 314 may comprise one or more internal modules developed by an entity maintaining the application construction system 130. The external data storage 316 may comprise external or third party data and/or external modules associated with a third party user and/or third party system 140. The application testing environments 318 may comprise storage of one or more active or previous testing environments provided to users for platform development. The constructed application platforms 320 may comprise one or more previously constructed user application platforms.

In one embodiment of the invention, the application construction system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the application construction system 130 may include multiple systems, servers, computers or the like maintained by one or many entities. In some embodiments, the application construction system 130 may be part of the entity systems 120. In other embodiments, the entity systems 120 are distinct from the application construction system 130. The application construction system 130 may communicate with the entity systems 120 via a secure connection generated for secure encrypted communications between the two systems either over the network 101 or alternative to the network 101.

Figure 4:
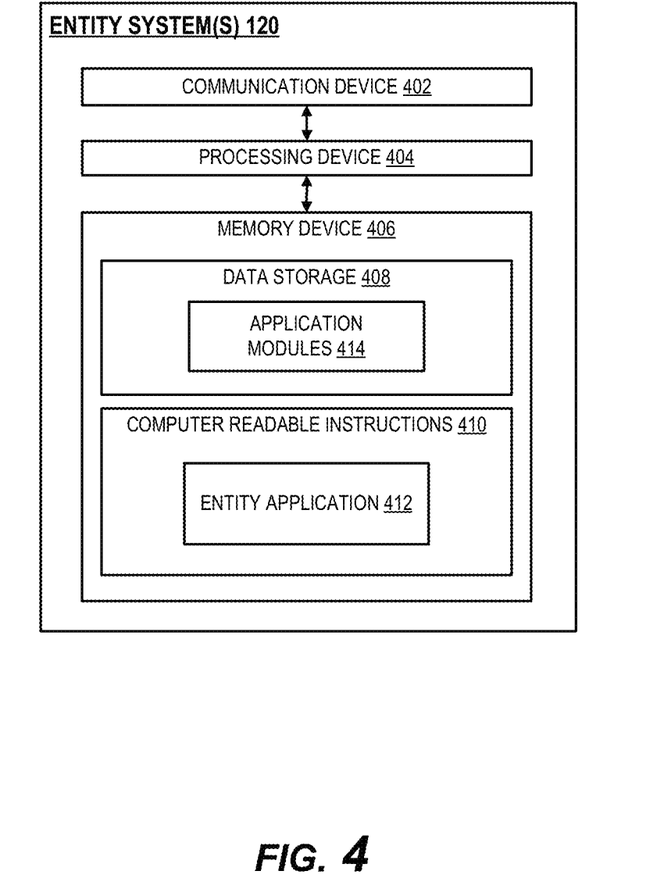
FIG. 4 provides a block diagram of an entity system, in accordance with one embodiment of the invention.

As illustrated in detail in FIG. 4, the environment 100 further includes one or more entity systems 120 which are connected to the user device 110 and the application construction system 130. The entity systems 120 may be associated with one or more entities, institutions or the like, such as an entity maintaining the application construction system 130. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the application construction system 130 to provide access to accounts, resources, data (e.g., application modules 414) stored and maintained on the entity systems 120. In some embodiments, the entity system 120 may communicate with the application construction system 130 during an interaction with a user 102 in real-time, wherein user interactions may be monitored and processed by the application construction system 130. In some embodiments, data storage 408 comprises application modules 414 to either supplement or replace similar data storages or databases on the application construction system 130 as previously discussed.

Figure 5:
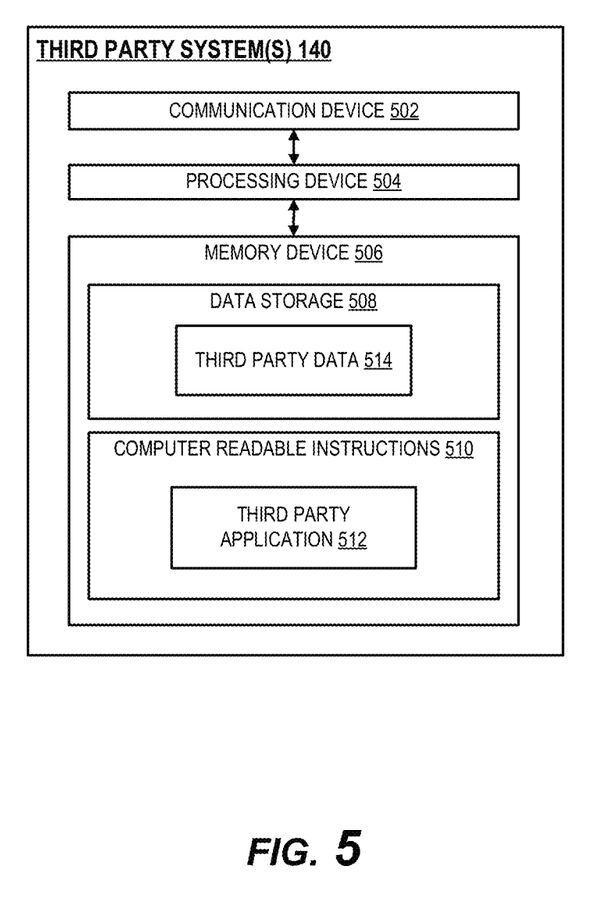
FIG. 5 provides a block diagram of a third party system, in accordance with one embodiment of the invention.

As illustrated in detail in FIG. 5, the environment 100 further includes one or more third party systems 140 which are connected to the user device 110, entity systems 120, and the application construction system 130. The third party systems 140 may be associated with one or more users or customers of the application construction system 130. The third party systems 140 generally comprise a communication device 502, a processing device 504, and a memory device 506 further comprising data storage 508. The third party systems 140 comprise computer-readable instructions 510 stored in the memory device 506, which in one embodiment includes the computer-readable instructions of a third party application 512. The third party systems 140 may communicate with the user device 110, entity systems 120, and the application construction system 130 to provide access to accounts, resources, data (e.g., third party data 514) stored and maintained on the third party systems 140. In some embodiments, the third party system 140 may communicate with the application construction system 130 during an interaction with a user 102 in real-time, wherein user interactions may be monitored and processed by the application construction system 130. In some embodiments, data storage 408 comprises external data sources or database such as third party or external data 514 to either supplement or replace similar data storages or databases on the application construction system 130 as previously discussed. In a specific embodiment, the third party system 140 is associated with a user who is a customer interacting with the application construction system 130 to construct an application platform in a testing environment, wherein third party data 514 such as external or legacy application modules may be extracted from the third party system 140 and imported into the testing environment.

The systems of the environment 100 may be used to construct application platforms to provide customized business solutions for merchant customers. As previously discussed, the system of the present invention is configured to provide an application testing environment in which an application platform may be constructed and experienced by a user before the application platform is introduced to a production-level environment. The system is configured to extract, import, and integrate external user data including external application modules into the testing environment to realistically simulate the user's platform in production. By using real user data, the system may be configured to identify and rectify compatibility issues in the newly constructed platform at a testing level before the platform is put into production.

Figure 6:
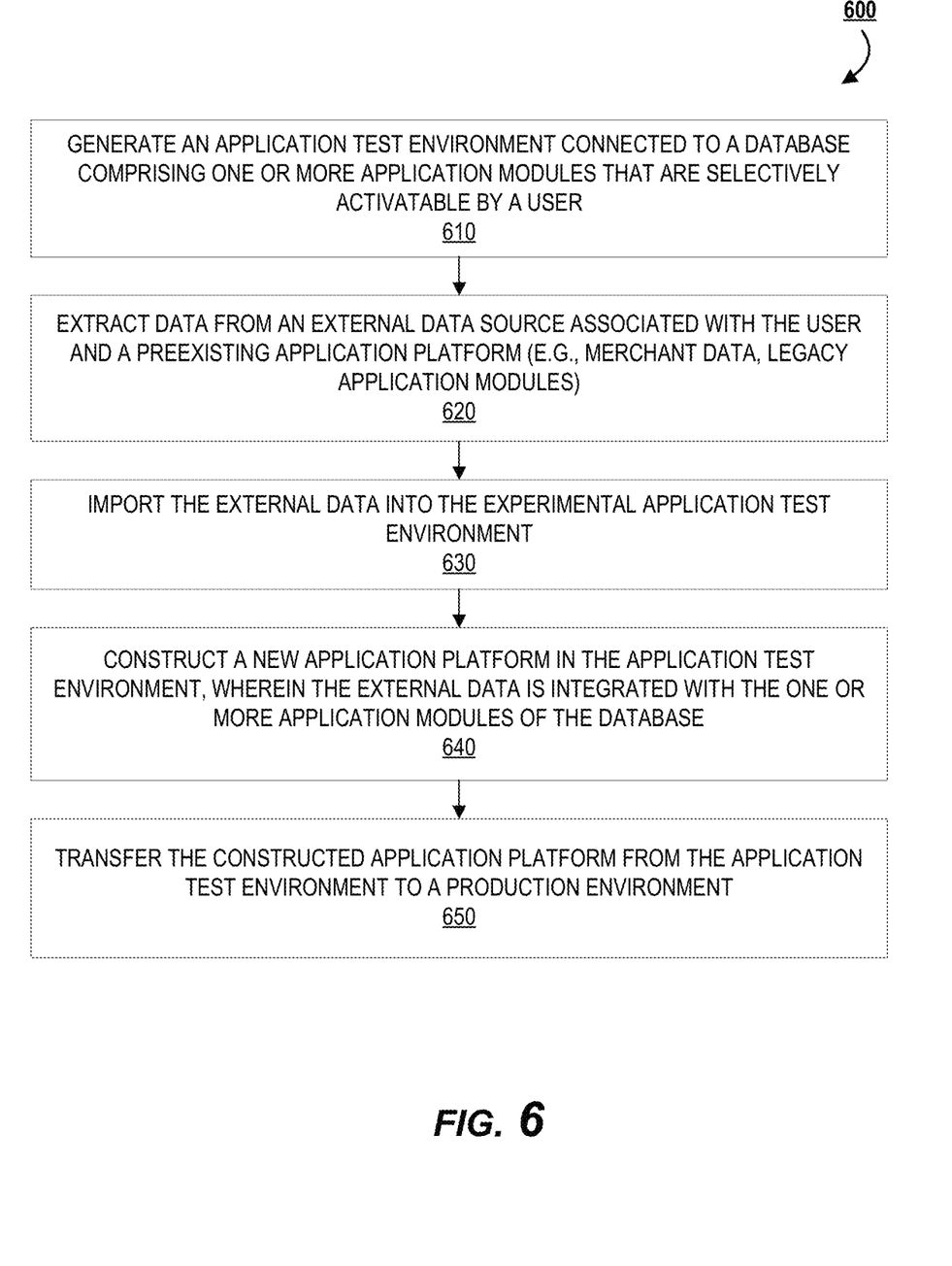
FIG. 6 provides a high level process flow for building a custom application platform, in accordance with one embodiment of the invention.

FIG. 6 provides a high level process flow for building a custom application platform, in accordance with one embodiment of the invention. As illustrated in block 610, the system may first generate an application test environment. An application test environment is a closed, non-production-level environment in which an application platform may be constructed. In contrast, a production environment may be a real-time setting where a constructed application may be run for their intended uses by a user. A production environment may include a constructed application platform installed on computer hardware. In one embodiment, the system may generate an application test environment on a user device associated with a user requesting the constructed application product. In another embodiment, the system may host an application test environment on behalf of the user, wherein the test environment is not generated directly on a user device, but the user may remotely access and interact with the test environment hosted on another system (e.g., entity system 120, application construction system 130). In a specific embodiment, the system may generate the application test environment on a virtual machine configured to provide functionality of a physical computer. In this way the virtual machine may provide a substitute for a real machine and provide the functionality for executing applications in a controlled environment.

In some embodiments, the system may identify current usages of a user, such as current user applications and legacy applications. Once identified, the system may be able to stage or pre-set a starter set of applications for the user. The system may comprise entity provided or partner provided software and hardware devices. Furthermore, the applications include independent software vendor software, core processing system software, or the like.

As used herein, an "application platform" refers to a collection of application modules and functionalities integrated together to provide an operable software product, program, or collection thereof (e.g., an enterprise-level application platform or product). As used herein, an "application module" may comprise an application or software component or function that contains one or more routines. Individual application modules may be configured to perform unique and separate actions or operations. In a specific embodiment, the application modules may be configured for a business solution application product or service. In some embodiments, the systems described herein may leverage modern, newly developed or customized application modules and legacy application modules, wherein modern application modules and legacy application modules may be integrated together in a constructed application platform.

In one embodiment, the application test environment may be connected to an internal database comprising one or more application modules. An internal database may refer to data storage associated with an entity maintaining the application construction system 130, wherein the one or more application modules stored in the internal database may be developed software products offered to users (e.g., merchants, businesses) for deployment by the system within constructed applications described herein. As discussed in additional detail below, the one or more application modules may be selectively activated by a user within a constructed application platform built inside the test environment.

As illustrated in block 620, the system is configured to extract data from an external data source associated with a requesting user. In some embodiments, a requesting user may be a customer or client of an entity maintaining the system, wherein the user is requesting construction of one or more application platforms in a test environment to demo the software products and features offered by the entity. The system may extract external user data from an external data source associated with the user (e.g., third party system 140) to realistically simulate the application modules in a production environment. By using real user data, the system may be configured to identify and rectify compatibility issues in the newly constructed platform at a testing level before the platform is put into actual production. In one embodiment the external data may include external application modules associated with the user. For example, a user may wish to integrate preexisting application modules or functionalities into a new platform in combination with additional or new application modules. In another embodiment, external data may comprise legacy application modules, wherein the legacy application modules may be integrated or optionally replaced with new application modules while constructing the new application platform for the user.

In one embodiment, the external data may comprise production environment data stored in the external data source (e.g., third party system 140) associated with the user. In a specific embodiment, the external data is temporarily stored in the application test environment and/or the application construction system 130, wherein the system is configured to remove the external data from the application test environment following a termination of an interaction with the user. In this way, potential exposure of valuable, production-level data (e.g., proprietary data, financial data, personal identifying information, etc.) may be reduced.

As illustrated in block 630, the system is configured to import the external data from the external data source to the application text environment. The system is configured to integrate the one or more external application modules and/or legacy application modules with the one or more application modules stored on the internal database that are already accessible for deployment in the test environment and maintained by a maintaining entity.

As illustrated in block 640, the system constructs a new application platform in the application test environment. The system constructs the new application platform using the available application modules and data. Available data may include the external data extracted form the third party system 140 associated with the user and/or simulated data generated by the application construction system 130. Available application modules may include the one or more application modules of the internal database, preexisting application modules extracted from the third party system 140 associated with the user, and/or legacy application modules associated with the user extracted from the third party system 140. As previously discussed, external data is integrated into the application test environment by the system along with the one or more application modules of the internal database.

In one embodiment, the system may comprise a display device configured for presenting a user interface to a user (e.g., in user application 238, platform construction application 312). The system and display device are configured to allow the user to interact with the display device while constructing a new application platform. In some embodiments, the one or more application modules are selectively activatable in the application test environment by the user in response to a user selection of the one or more application module. The system is configured to receive a selection request from the user to selectively activate or deactivate at least one of the one or more application modules. In response to receiving the request, the system is configured to activate or deactivate the selected application modules for the new application platform in the application test environment. In some embodiments, selection and subsequent deployment of application modules may occur in real-time, wherein the user may observe the effects of the integrated modules within the test environment. Non-limiting examples of user selections of or interactions with available application modules may comprise clicking, swiping, dragging-and-dropping, toggling, text or data entry, and the like.

As illustrated in block 650, the system is configured to transfer the constructed application platform from the application test environment to a production-level environment pending user approval. In this way, a user may participate in construction a new application platform, approve the constructed platform and immediately deploy the platform to a production environment with little to no downtime. Additionally, as the system may integrate production level data from the user and associated user systems (e.g., third party system 140), the new application platform may already include user-specific information required to operate in production.

In some embodiments, after the test from the test environment has been completed, the system may perform a data scrub and completely delete and/or perform destruction on all user data such that the user data is no longer accessible from the test environment.

In some embodiments, the system may be further configured to monitor a new application platform in the production environment for one or more anomalies, inconsistencies, errors, bugs, or the like. In response to detecting an anomaly or the like, the system may be configured to pull the newly deployed application platform from the production environment and revert application platform back to the application testing environment. In some embodiments, the system may be configured to generate and store backup versions of an application platform in the system (e.g., constructed application platforms 320). In some embodiments, the system may be configured to periodically store a backup of a constructed platform to provide restore points for a platform construction.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with constructing customized application platforms for a production environment.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for constructing customized application platforms for a production environment, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for customizing and testing software application platforms, the system comprising:
   a memory device with computer-readable program code stored thereon;
   a communication device connected to a network; and
   a processing device, wherein the processing device is configured to execute the computer-readable program code to:
      generate an application test environment, the application test environment being connected to an internal database comprising one or more application modules for selective activation in the application test environment;
      identify current usages of a user, wherein the current usages of the user comprise current user applications and legacy applications being used by the user in a preexisting application platform;
      extract external data from an external data source associated with the current usage of the user, wherein the external data comprises:
         one or more external application modules from the current user applications being used by the user in the preexisting application platform;
         one or more legacy application modules from the legacy applications being used by the user in the preexisting platform; and
         production environment data associated with the user from the preexisting platform;
      import the external data into the application test environment;
      construct a new application platform in the application test environment by integrating, into the application test environment and with the one or more application modules of the internal database, the one or more external application modules from the current user application being used by the user in the preexisting application platform and the one or more legacy applications modules from the legacy application being used by the user in the preexisting application platform;
      simulate the new application platform in the application test environment using the production environment data extracted from the external data source and simulated data generated with the application test environment to identify and rectify compatibility issues between the one or more application modules of the internal database, the one or more external application modules from the current user applications being used by the user in the preexisting application platform, and the one or more legacy application modules form the legacy application being used by the user in the preexisting application platform;
      transfer, after rectifying the identified compatibility issues, the new application platform from the application test environment to a production environment;
      remove the production environment data from the application test environment after a termination of an interaction with the user;
      monitor the new application platform in the production environment for an anomaly;
      detect the anomaly in the new application platform; and
      in response to detecting the anomaly, pull the new application platform from the production environment, wherein the new application platform is reverted to the application testing environment.

2. The system of claim 1, wherein the processing device is configured to execute the computer-readable program code to:
   receive a selection request from the user to selectively activate or deactivate at least one of the one or more application modules; and
   in response to receiving the selection request, activate or deactivate the at least one of the one or more application modules for the new application platform in the application test environment.

3. The system of claim 1, wherein the processing device is configured to execute the computer-readable program code to, when transferring the new application platform from the application test environment to the production environment, transfer the new application platform from the application test environment to the production environment pending approval from the user.

4. The system of claim 1, wherein the application test environment is generated on a virtual machine.

5. The system of claim 1, further comprising a display device configured for presenting a user interface, wherein the processing device is configured to execute the computer-readable program code to cause the display device to display the one or more application modules, wherein the one or more application modules are selectively activatable in the application test environment in response to a user selection of the one or more application modules.

6. A computer program product for customizing and testing software application platforms, wherein the computer program product comprises a non-transitory computer-readable medium comprising computer-readable instructions, the computer-readable instructions, when executed by a processing device, cause the processing device to:
generate an application test environment, the application test environment being connected to an internal database comprising one or more application modules for selective activation in the application test environment;
identify current usages of a user, wherein the current usages of the user comprise current user applications and legacy applications being used by the user in a preexisting application platform;
extract external data from an external data source associated with the current usages of the user, wherein the external data comprises:
one or more external application modules from the current user applications being used by the user in a preexisting application platform;
one or more legacy application modules from the legacy applications being used by the user in the preexisting platform; and
production environment data associated with the user from the preexisting platform;
import the external data into the application test environment;
construct a new application platform in the application test environment by integrating, into the application test environment and with the one or more application modules of the internal database, the one or more external application modules from the current user applications being used by the user in the preexisting application platform and the one or more legacy application modules from the legacy application being used by the user in the preexisting application platform;
simulate the new application platform in the application test environment using the production environment data extracted from the external data source and simulated data generated with the application test environment to identify and rectify compatibility issues between the one or more application modules of the internal database, the one or more external application modules from the current user applications being used by the user in the preexisting application platform, and the one or more legacy application modules from the legacy application being used by the user in the preexisting application platform;

transfer, after rectifying the identified compatibility issues, the new application platform from the application test environment to a production environment;
removed the production environment data from the application test environment after a termination of an interaction with the user;
monitor the new application platform in the production environment for an anomaly;
detect the anomaly in the new application platform; and
in response to detecting the anomaly, pull the new application platform from the production environment, wherein the new application platform is reverted to the application testing environment.

7. The computer program product of claim 6, wherein the computer-readable instructions, when executed by the processing device, cause the processing device to:
receive a selection request from the user to selectively activate or deactivate at least one of the one or more application modules; and
in response to receiving the selection request, activate or deactivate the at least one of the one or more application modules for the new application platform in the application test environment.

8. The computer program product of claim 6, wherein the computer-readable instructions, when executed by the processing device, cause the processing device to, when transferring the new application platform from the application test environment to the production environment, transfer the new application platform from the application test environment to the production environment pending approval from the user.

9. The computer program product of claim 6, wherein the application test environment is generated on a virtual machine.

10. The computer program product of claim 6, wherein the computer-readable instructions, when executed by the processing device, cause the processing device to cause a display device configured for presenting a user interface to display the one or more application modules, wherein the one or more application modules are selectively activatable in the application test environment in response to a user selection of the one or more application modules.

11. A computer-implemented method for customizing and testing software application platforms, the computer-implemented method comprising:
generating an application test environment, the application test environment being connected to an internal database comprising one or more application modules for selective activation in the application test environment;
identifying current usages of a user, wherein the current usages of the user comprise current user applications and legacy applications being used by the user in a preexisting application platform;
extracting external data from an external data source associated with the current usage of the user, wherein the external data comprises:
one or more external application modules from the current user applications being used by the user in the preexisting application platform;
one or more legacy application modules from the legacy applications being used by the user in the preexisting platform; and
production environment data associated with the user form the preexisting platform;
importing the external data into the application test environment;

construction a new application platform in the application test environment by integrating, into the application test environment and with the one or more application modules of the internal database, the one or more external application modules from the current user applications being used by the user in the preexisting application platform and the one or more legacy application modules from the legacy applications being used by the user in the preexisting application platform;

simulating the new application platform in the application test environment using the production environment data extracted from the external data source and simulated data generated with the application test environment to identify and rectify compatibility issues between the one or more application modules of the internal database, the one or more external application modules from the current user applications being used by the user in the preexisting application platform, and the one or more legacy application modules from the legacy applications being used by the user in the preexisting application platform;

transferring, after rectifying the identified compatibility issues, the new application platform from the application test environment to a production environment; and removing the production environment data form the application test environment after a termination of an interaction with the user;

monitoring the new application platform in the production environment for an anomaly;

detecting the anomaly in the new application platform; and in response to detecting the anomaly, pulling the new application platform from the production environment, wherein the new application platform is reverted to the application testing environment.

12. The computer-implemented method of claim 11, wherein transferring the new application platform form the application test environment to the production environment comprises transferring the new application platform from the application test environment to the production environment pending approval from the user.

13. The computer-implemented method of claim 11, further comprising:
   receiving a selection request from the user to selectively activate or deactivate at least one of the one or more application modules; and
   in response to receiving the selection request, activating or deactivating the at least one of the one or more application modules for the new application platform in the application test environment.

14. The computer-implemented method of claim 11, wherein the application test environment is generated on a virtual machine.

15. The computer-implemented method of claim 11, further comprising:
   causing a display device to display the one or more application modules, wherein the one or more application modules are selectively activatable in the application test environment in response to a user selection of the one or more application modules.

* * * * *